(No Model.) 2 Sheets—Sheet 1.

F. A. PERRET.
ELECTRIC MOTOR.

No. 586,825. Patented July 20, 1897.

Attest:
Geo. H. Botts
A. V. Bowker

Inventor:
Frank A. Perret
By Philipp Numson Shelf
Att'ys

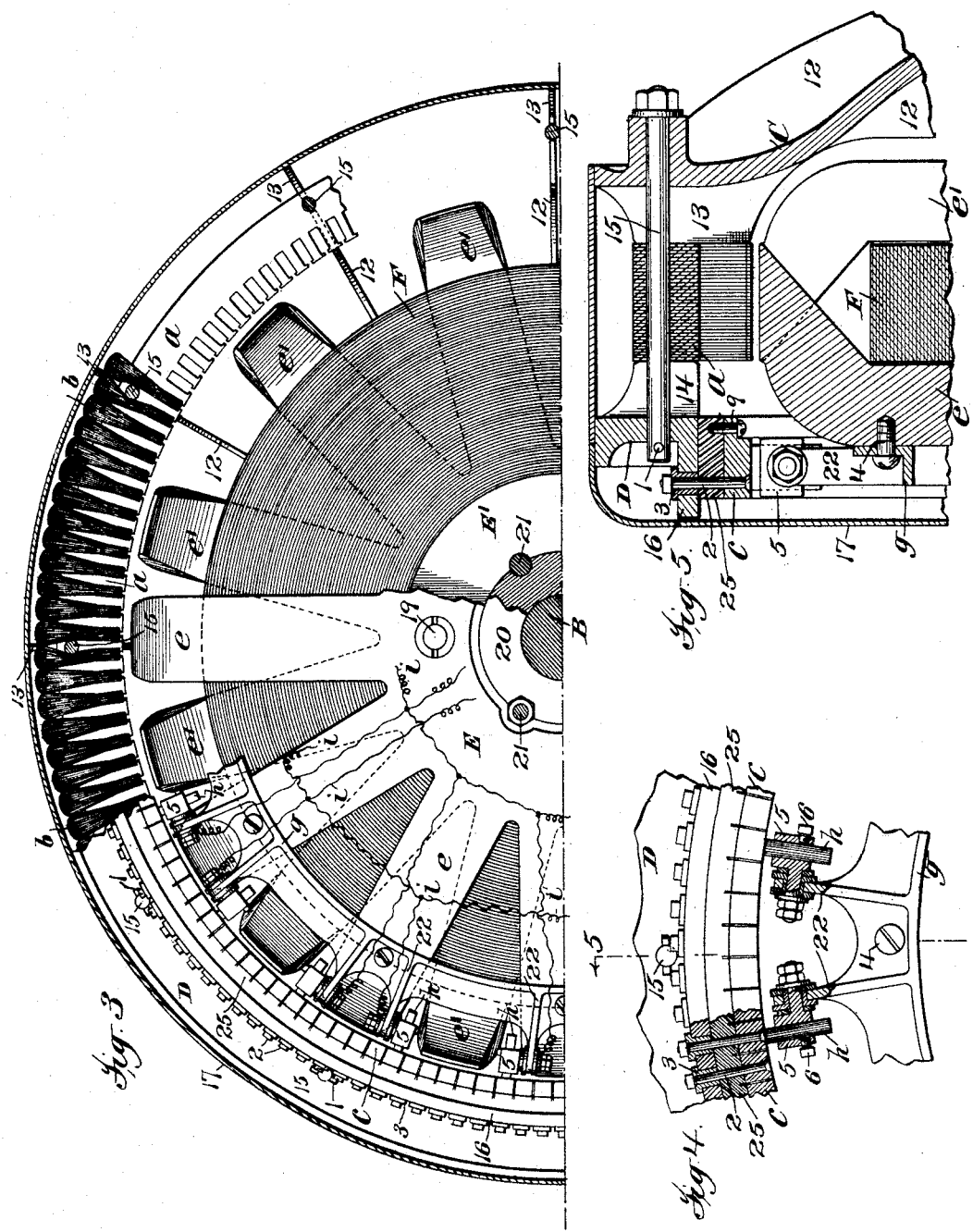

UNITED STATES PATENT OFFICE

FRANK A. PERRET, OF BROOKLYN, NEW YORK, ASSIGNOR TO HEBER STONE, OF BRENHAM, TEXAS.

ELECTRIC MOTOR.

SPECIFICATION forming part of Letters Patent No. 586,825, dated July 20, 1897.

Application filed March 27, 1897. Serial No. 629,513. (No model.)

*To all whom it may concern:*

Be it known that I, FRANK A. PERRET, a citizen of the United States, residing at Brooklyn, county of Kings, and State of New York, have invented certain new and useful Improvements in Electric Motors, fully described and represented in the following specification and the accompanying drawings, forming a part of the same.

This invention relates to an improved electric motor designed especially for use in motor-vehicles of that class in which the motor acts directly upon the driving-wheel of the vehicle without the interposition of gearwheels or other power-transmitting mechanism. An electric motor fulfilling the requirements of this service must be very strong, light in weight, and simple in construction, and must combine with these features good efficiency at very low rates of rotation and great torque or pull at a standstill and at initial speeds. These elements are so antagonistic that the difficulties met with in the production of such an electric motor have resulted in the direction of recent effort in vehicle propulsion chiefly to the employment of high-speed motors, with reducing-gears between the motor and the driving-wheel. The noise and vibration of a high-speed motor working through reducing-gears, the increased number of parts and their weight, and the waste of power in the gears are well-recognized serious objections to motor-vehicles so propelled and practically fatal to their use, except on railways or elsewhere under conditions permitting the use of a very heavy motor.

By my invention I am enabled to construct an improved electric motor, which may be assocated directly with the driving-wheel of a motor-vehicle and the use of gears or other power - transmitting mechanism avoided, while the motor secures all the essential working requirements of such a motor, with great strength, simplicity, and convenience of mechanical parts and light weight, so that the construction of a light and practical electrically-driven road-vehicle is made possible.

As a full understanding of the invention can best be given by a detailed description of a construction embodying the invention, such a description will now be given in connection with the accompanying drawings, showing the driving-wheel and motor of a motor-carriage embodying my invention in the preferred form, and the features forming the invention will then be specifically pointed out in the claims.

Figure 1:
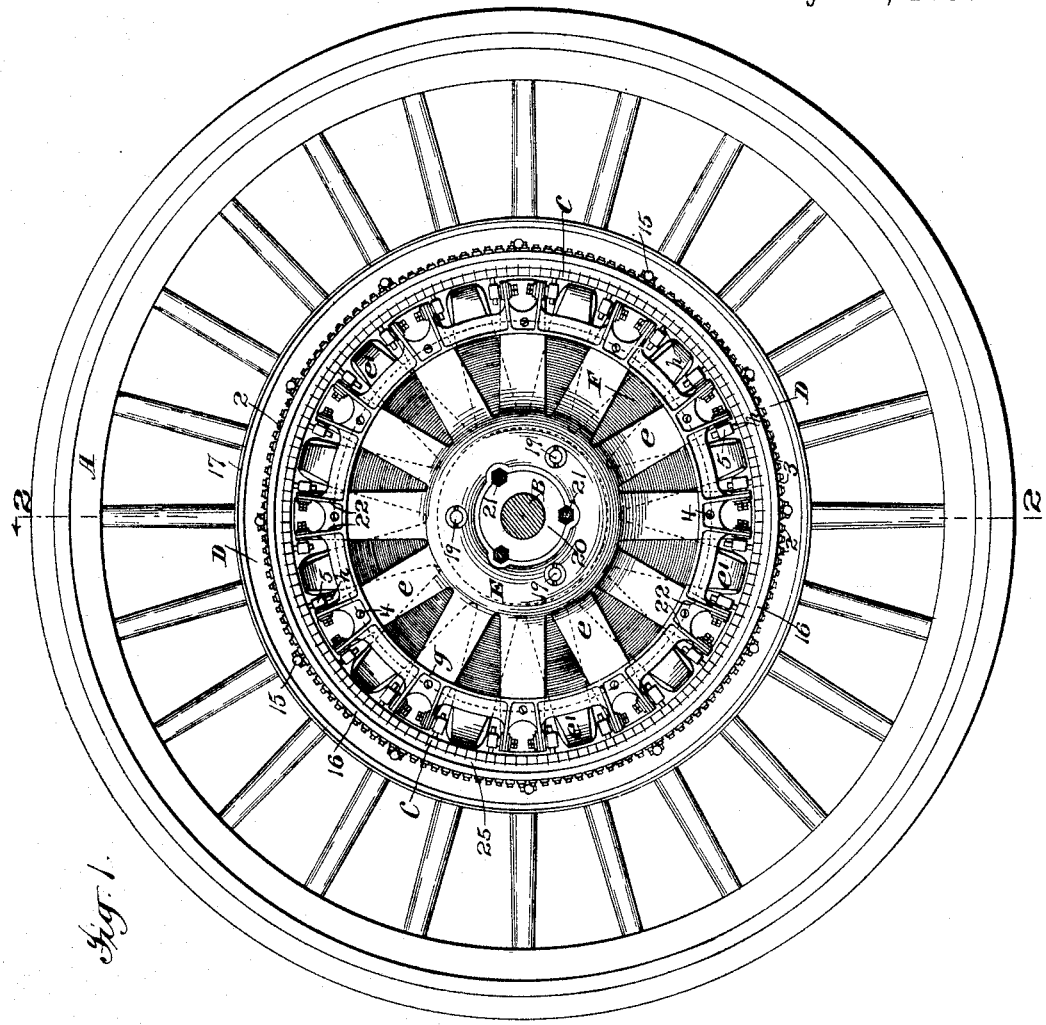
Figure 2:
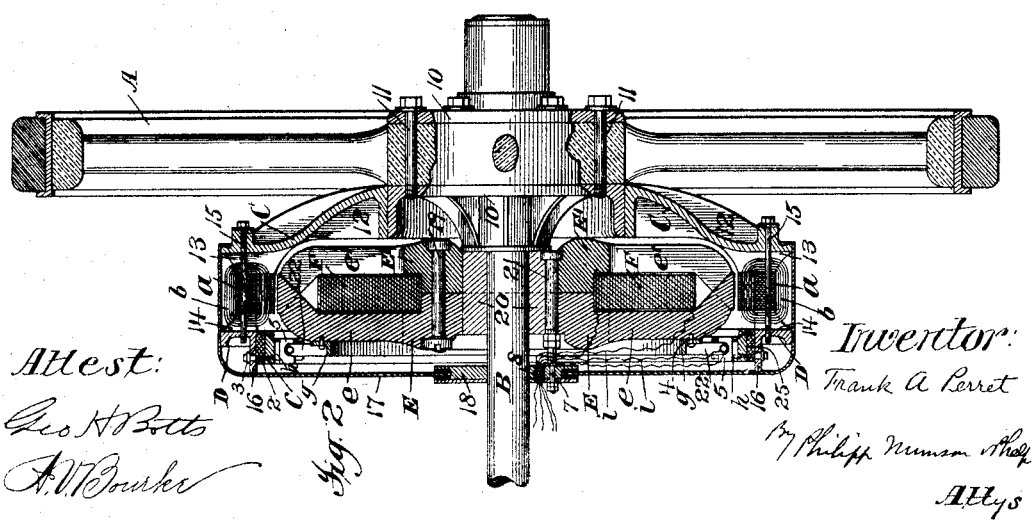

In the drawings, Figure 1 is a side elevation of the motor and wheel, looking to the right in Fig. 2. Fig. 2 is a central section of the motor and wheel on the line 2 of Fig. 1 with the wheel-hub shown in elevation. Fig. 3 is an enlarged side view of one-half the motor, partly broken away to show the construction. Fig. 4 is a detail view of the brush and commutator-ring construction. Fig. 5 is a detail section on the line 5 of Fig. 4.

Referring to said drawings, A is the carriage-wheel, which may be of any common or suitable form and mounted in any suitable manner to rotate freely upon the stationary axle B. Upon the inner side of this wheel and rigidly secured to the wheel-hub, which is shown as consisting of two metal pieces 10, with the wooden wheel clamped between them by bolts 11, is an armature-supporting ring, shown as formed by the edge of a spider C, seated upon a flange on the inner metal part of the wheel-hub and consisting of a metal plate, preferably of aluminium for lightness, and having internal and external radial ribs 12 to secure the strength required. The ring-armature of the motor is secured directly to the spider C as follows:

The spider C is provided at its outer edge with inwardly-projecting ribs 13, preferably in line with the ribs 12, and between these ribs 13 and projections or ribs 14 on the commutator-ring D is secured by bolts 15 with key-pins 1 the armature-core *a*, these bolts and ribs thus forming supports for the armature. The armature-core *a* is preferably laminated, as shown, and provided with teeth, between which are applied about the core the armature-coils *b*, as usual in such constructions. The commutator-supporting ring D is preferably made of aluminium for lightness and has an outwardly-projecting flange 16, to which the commutator-bars *c*, forming the ring-commutator, are secured by bolts 2 in insulating-sleeves 3, and the commutator-bars $c$ are insulated from the flange 16 by an insulating-ring 25, to which also the bars are secured by screws 9.

Secured to the edges of the spider C and commutator-supporting ring D, and preferably divided on ring D into two parts, as shown, for convenience, and arranged so as to be readily detached for access to the motor, is a covering-plate 17, which extends over the edge and inner side of the motor with its edge running in a stuffing-box formed by a stationary ring 18, surrounding the axle B, and having a groove in its edge which carries suitable lubricating material. Thus the spider C, with this plate 17 and ring 18, completely incloses the motor, so that none of its parts are accessible to dust or other accidental injury by light material, although readily accessible by the removal of the cover 17.

Inside the ring-armature and rigidly mounted upon the stationary axle B is the field-magnet. The field-core consists of the two metal rings E E', secured together and each provided with pole-arms $e$ $e'$, twelve in number in the construction shown, these pole-arms $e$ $e'$ on the respective rings alternating when the parts are assembled and having inwardly-projecting ends, so as to form interprojecting north and south poles opposite the armature. The two rings E E' are shown as connected together by bolts 19 and are mounted upon and secured to a sleeve 20, formed on or secured to the axle B, the rings being shown as secured to the sleeve by bolts 21 in half-circular grooves formed in the outer surface of the sleeve 20 and inner surfaces of the rings E E'. These bolts 21 are extended outside the sleeve 20 and have reduced portions 7 passing through the stuffing-box 18 and to which the stuffing-box is secured by nuts, and thus supported. The rings E E' are cut away on their inner faces, so as to form a recess between them corresponding with the space between the arms $e$ $e'$, and within this recess and between the pole-arms $e$ $e'$ is the single coil F, which preferably consists of a ring formed by a narrow plate of thin metal wound upon itself.

The field-magnet carries the brush-holder ring directly, this ring $g$ being mounted upon the outer side of the arms $e$, which are next the cover 17, and secured to these arms by screws 4. This brush-ring $g$ has outwardly-extending lugs 22, in which are mounted with suitable insulation brush-carriers 5, carrying the brushes $h$, these brushes, preferably, being laminated, as shown, and made adjustable toward and from the commutator-ring, with bolts 6 for holding them in adjusted position. The brush-carriers 5 are suitably constructed for wire connection, as usual in similar constructions.

The wiring of the motor will be readily understood by those skilled in the art, and for clearness is not shown in Fig. 1, but is indicated in part in Fig. 3 and the lead of the wires to the motor shown in Fig. 2, the wires $i$ being bunched and passing through an opening 8 in the ring stuffing-box 18 on axle B.

It will be seen that the construction shown provides a simple and light electric motor associated directly with the wheel, in which the required efficiency at low speed of rotation is secured by a ring-armature of very large diameter directly connected with the wheel—that is, without the interposition of gears or other power-transmitting mechanism—and a field-magnet with a large number of interprojecting poles mounted inside the armature and directly on the axle, so that the size and weight of the field-magnet are reduced to a minimum and its necessary weight supported by the axle, while the minimum length of the magnet-circuit is thus secured and the single field-coil gives the most efficient application of the current. The interprojecting poles reduce largely the width of the armature, a common surface of the armature being presented to both north and south poles, and the armature, therefore, may be very light, although of large diameter. By these features I am enabled to obtain the efficiency required with motor parts of little weight. The entire motor construction also is practically without shaft, bearings, or frame, so that there are no inert parts and useless weight, but the wheel and axle carry all the necessary parts, the wheel carrying the armature directly and the commutator being mounted directly upon the armature, while the axle carries the field-magnet directly and the brushes are mounted directly upon the field-magnet.

The use of a single coil in the field-magnet with interprojecting poles requires that provision be made for the convenient insertion and removal of the coil, and for this purpose the field-magnet core is split or formed of the two rings E and E', so that the field-magnet coil may be slipped onto one ring and then the other placed in position and secured by means of the bolts 19. It is preferable, although not essential, that this division of the field-core be on the median line, as shown, since the seam or division-line forms a resistance to the magnetic flux, which if the seam were near the poles would interfere largely with the magnetic action. By dividing the core on the median line, however, so that this seam is located at or near the center of the exciting-coil, it presents very little resistance to the magnetic lines of force generated in the iron.

An important detail feature of my construction is involved in the attachment of the armature-core and commutator-supporting ring D to the spider C. In previous constructions in which a ring armature has been secured by bolts or similar metallic connections the bolts have been insulated in order to prevent the formation of induced currents and resulting loss of energy and generation of heat. This insulation of the bolts, however, produces a mechanically weak construction, and as the pull is transmitted through these bolts a strong connection is required, which is especially important when the armature is supported at one side only, as in the motor shown. I avoid the use of insulation by locating the bolts non-inductively with relation to the poles, so that no circuit exists and induced currents are not generated. This requires in the motor shown that all the bolts be always in the same relative position to poles of the same sign and to the magnetic field between the poles at the same time, and this result is secured in the construction shown with a large number of bolts by arranging the bolts at the same distance apart as poles of the same sign. Some of these bolts may be omitted and the same result may be secured by any arrangement by which the bolts are all at the same distance from poles of the same sign. Thus the resulting electromotive forces in the bolts are of the same direction and no circuit exists and no current is set up. I am thus enabled to fit the bolts closely to the spider and commutator-ring, metal to metal, and obtain the mechanical strength resulting therefrom.

It will be understood that I am not to be limited to the exact form or arrangement of the parts of the construction shown, as many modifications may be made therein without departing from the invention.

What I claim is—

1. The combination with a driving-wheel and stationary axle, of an armature directly connected with the wheel, a commutator-support mounted directly on the armature, a field-magnet mounted directly upon the stationary axle, and a brush-support mounted directly on the field-magnet, substantially as described.

2. The combination with a driving-wheel, and stationary axle, of an armature directly connected with the wheel, a commutator-support mounted directly on the armature, a field-magnet mounted directly upon the stationary axle, and a stationary brush-support, substantially as described.

3. The combination with a driving-wheel and stationary axle, of a ring-armature mounted directly on the wheel, a commutator carried by the armature, a multipolar field-magnet mounted directly on the stationary axle, and a brush-ring carrying the brushes and mounted directly on the field-magnet, substantially as described.

4. The combination with a driving-wheel and stationary axle, of a ring-armature mounted directly on the wheel, a commutator carried by the armature, a multipolar field-magnet mounted directly on the stationary axle, and a stationary brush-ring carrying the brushes, substantially as described.

5. The combination with a driving-wheel and stationary axle, of a ring-armature directly connected with the wheel, a commutator-ring carrying the commutator, a multipolar field-magnet mounted directly on the stationary axle, and a brush-ring carrying the brushes and mounted directly on the field-magnet, substantially as described.

6. The combination with a driving-wheel and stationary axle, of a ring-armature directly connected with the wheel, a commutator carried by the wheel, a multipolar field-magnet with interprojecting alternating poles mounted upon the stationary axle, and a stationary brush-support, substantially as described.

7. The combination with a driving-wheel and stationary axle, of a ring-armature directly connected with the wheel, a commutator carried by the wheel, a multipolar field-magnet with interprojecting alternating poles and a single exciting-coil mounted upon the stationary axle, and a stationary brush-support, substantially as described.

8. The combination with a driving-wheel and stationary axle, of a ring-armature directly connected with the wheel, a commutator carried by the wheel, a multipolar field-magnet with interprojecting alternating poles mounted upon the stationary axle, and a brush-support mounted directly on the field-magnet, substantially as described.

9. The combination with a driving-wheel and stationary axle, of a ring-armature directly connected with the wheel, a commutator carried by the wheel, a multipolar field-magnet with interprojecting alternating poles and a single exciting-coil mounted upon the stationary axle, and a brush-support mounted directly on the field-magnet, substantially as described.

10. The combination with a driving-wheel and stationary axle, of a ring-armature directly connected with the wheel, a commutator mounted on the armature, a multipolar field-magnet divided at or near the median plane and having interprojecting alternating poles and mounted upon the stationary axle, and a brush-support mounted directly on the field-magnet, substantially as described.

11. The combination with a driving-wheel and stationary axle, of a ring-armature directly connected with the wheel, a commutator mounted on the armature, a multipolar field-magnet divided at or near the median plane and having interprojecting alternating poles and mounted upon the stationary axle, and a stationary brush-support, substantially as described.

12. The combination with a driving-wheel and stationary axle, of a ring-armature directly connected with the wheel, a commutator carried by the wheel, a multipolar field-magnet divided at or near the median plane and having interprojecting alternating poles and a single exciting-coil mounted upon the stationary axle, and a stationary brush-support, substantially as described.

13. The combination with a driving-wheel and stationary axle, of a ring-armature directly connected with the wheel, a commutator carried by the wheel, a multipolar field-magnet divided at or near the median plane and having interprojecting alternating poles and a single exciting-coil mounted upon the stationary axle, and a brush-support mounted directly on the field-magnet, substantially as described.

14. The combination of a driving-wheel and stationary axle, a ring-armature directly connected with the wheel, a commutator carried by the wheel, a multipolar field-magnet within said armature, a stationary brush-support, and metallic supports for said armature all arranged at the same distance from poles of the same sign, substantially as described.

15. The combination of a driving-wheel, a ring-armature directly connected with the wheel, a commutator carried by the wheel, a multipolar field-magnet with interprojecting alternating poles within said armature, a stationary brush-support, and metallic supports for said armature all arranged at the same distance from poles of the same sign, substantially as described.

16. The combination with a ring-armature, of a commutator-ring mounted directly on the armature, a field-magnet within the armature, and a brush-ring mounted directly upon the field-magnet, substantially as described.

17. The combination with an armature, of a commutator-ring mounted directly on the armature, a field-magnet, and a brush-ring mounted directly upon the field-magnet, substantially as described.

18. The combination with a ring-armature and commutator-ring, of a field-magnet within the armature, and a brush-ring mounted directly upon the field-magnet, substantially as described.

19. The combination with a ring-armature, and a commutator-ring, of a multipolar field-magnet within said armature having interprojecting poles, and a brush-ring mounted directly upon the poles of the field-magnet, substantially as described.

20. The combination with a ring-armature, of a commutator-ring mounted upon the armature, a multipolar field-magnet within said armature having interprojecting poles, and a brush-ring mounted directly upon the poles of the field-magnet, substantially as described.

21. The combination with a driving-wheel and stationary axle, of a ring-armature directly connected with the wheel, a commutator-ring mounted on the armature, a multipolar field-magnet mounted on the axle within said armature and having interprojecting alternating poles, and a brush-ring mounted directly on the field-magnet, substantially as described.

22. The combination with an armature and multipolar field-magnet, of metallic supports for the armature non-inductively located relatively to the poles, substantially as described.

23. The combination with an armature and multipolar field-magnet, of metallic supports for the armature all arranged at the same distance from field-poles of the same sign, substantially as described.

24. The combination with a ring-armature and its metallic supporting-ring, of a multipolar field-magnet within the armature, and metallic connections between the armature and supporting-ring all arranged at the same distance from poles of the same sign, substantially as described.

25. The combination with a driving-wheel and stationary axle, of a ring-armature and commutator carried by the wheel, a field-magnet and brushes mounted on the axle, and a cover carried by the wheel and inclosing the motor, substantially as described.

26. The combination with a driving-wheel and stationary axle, of an electric motor having its armature carried by the wheel and its field-magnet mounted on the axle, a plate carried by the wheel and inclosing the motor, and a stationary stuffing-box on the axle for the edge of the plate, substantially as described.

27. The combination with wheel A and axle B, of a ring-armature carried by said wheel, commutator-ring D on the opposite side of armature from the wheel, a multipolar field-magnet within said armature mounted on the axle and formed of the two rings E, E' having interprojecting poles $e$, $e'$ and coil F, and brush-ring $g$ on the poles $e$, substantially as described.

28. The combination with an armature-supporting ring, of commutator-ring D, and ring-armature core $a$ secured between the commutator and supporting rings, substantially as described.

29. The combination with supporting-ring C having projections 13, of commutator-ring D having projections 14, and armature-core $a$ between said projections, and bolts 15 or equivalent devices for securing the parts together, substantially as described.

In testimony whereof I have hereunto set my hand in the presence of two subscribing witnesses.

FRANK A. PERRET.

Witnesses:
C. J. SAWYER,
T. F. KEHOE.